United States Patent
Bell et al.

[11] Patent Number: 5,979,087
[45] Date of Patent: Nov. 9, 1999

[54] ELECTRIC MOTOR HAVING ELECTROSTATIC SHIELD ARRANGEMENT

[75] Inventors: Sidney Bell, Athens, Ga.; Michael J. Melfi, Euclid, Ohio; Stanley E. Wallace, Athens, Ga.

[73] Assignee: Reliance Electric Industrial Company, Cleveland, Ohio

[21] Appl. No.: 09/008,345

[22] Filed: Jan. 16, 1998

[51] Int. Cl.⁶ .................................................. H02K 1/12
[52] U.S. Cl. .................... 36/254; 310/68 C; 310/68 R;
310/196; 310/214; 310/215; 310/219; 310/220;
310/258; 310/260
[58] Field of Search ...................... 310/67 R, 72,
310/83, 196, 214, 215, 254, 258, 260, 68 C,
219, 220

[56] References Cited

U.S. PATENT DOCUMENTS

| | | |
|---|---|---|
| 2,573,126 | 10/1951 | Andrus . |
| 3,283,187 | 11/1966 | Schaefer . |
| 3,633,056 | 1/1972 | Hoffmeyer . |
| 3,633,057 | 1/1972 | Smith et al. . |
| 4,160,926 | 7/1979 | Cope et al. . |
| 4,246,505 | 1/1981 | Yasaka et al. ........................... 310/218 |
| 4,308,476 | 12/1981 | Schuler . |
| 4,780,635 | 10/1988 | Neumann . |
| 4,949,001 | 8/1990 | Campbell ............................... 310/220 |
| 5,175,396 | 12/1992 | Emery et al. . |
| 5,341,561 | 8/1994 | Schorm et al. . |
| 5,661,353 | 8/1997 | Erdman et al. . |
| 5,821,649 | 10/1998 | Langhorst .............................. 310/68 R |
| 5,821,652 | 10/1998 | Hyppio .................................... 310/83 |

FOREIGN PATENT DOCUMENTS

| | | |
|---|---|---|
| 61-185034 | 8/1986 | Japan . |
| 9633880 | 7/1964 | United Kingdom . |

OTHER PUBLICATIONS

U.S. Ser. No. 008,043, Bell, filed Jan. 16, 1998, (pending).
U.S. Ser. No. 113,490, Bell et al., filed Jul. 10, 1998, (pending)

*Primary Examiner*—Elvin G. Enad
*Attorney, Agent, or Firm*—Craig N. Killen; John M. Miller; John J. Horn

[57] ABSTRACT

An electromechanical machine includes a stator fixed with respect to a housing structure and a rotor fixed with respect to a driven shaft. The stator includes a magnetically permeable core having a plurality of parallel winding slots containing conductive windings. Coilheads are located at opposite axial ends of the magnetically permeable core where the windings turn to extend down a parallel winding slot. The motor is equipped with electrostatic shield arrangements in the winding slots and coilheads to reduce capacitive coupling between the stator and rotor during operation.

5 Claims, 10 Drawing Sheets

ELECTRIC MOTOR HAVING ELECTROSTATIC SHIELD ARRANGEMENT

BACKGROUND OF THE INVENTION

The present invention relates generally to the art of electric motors and other electromechanical machines. More particularly, the invention relates to improved electrostatic shield arrangements for use in an electromechanical machine.

The shaft of an AC induction motor or other electromechanical machine is often supported by bearing assemblies maintained in position by the machine housing. In one known construction, each bearing assembly is supported by a portion of the housing known as the "end bell." As its name implies, the end bell is located at one axial end of the housing, and defines a hole through which the rotatable shaft freely extends.

During operation of an electric motor, capacitive coupling can often occur between the stator and rotor. Occasionally, the potential difference developed in this manner will exceed a magnitude necessary to break down insulating grease in the bearing assembly. In this case, currents may arc or discharge from the bearing balls or rollers to the outer bearing race causing "pits" or other undesirable effects. As a result, more frequent servicing of the bearing assemblies may be required.

The prior art has provided electrostatic shield arrangements to reduce capacitive coupling between the rotor and stator, and consequent current discharge through the bearing assemblies. Examples of various shield configurations can be seen in U.S. Pat. No. 5,661,353 to Erdman et al., incorporated herein by reference. While these arrangements have been effective at reducing capacitive coupling, a further need exists for various novel electrostatic shield arrangements that are compatible with mass production techniques.

SUMMARY OF THE INVENTION

The present invention recognizes and addresses the foregoing disadvantages, and others of prior art constructions and methods. Accordingly, it is an object of the present invention to provide an electromechanical machine having a novel electrostatic shield arrangement.

It is a more particular object of the present invention to provide an electromechanical machine having a novel electrostatic shield arrangement that is compatible with mass production techniques.

It is a further object of the present invention to provide a novel electrostatic shield arrangement that is compact and effective.

It is a further object of the present invention to provide a novel electrostatic shield arrangement in which a grounded conductive layer is separated from stator windings by an insulative layer.

Some of these objects are achieved by an electromechanical machine comprising a movable rotor and a fixed stator. The stator has conductive windings located in a plurality of parallel, axially-extending winding slots defined in a magnetically permeable core. Elongate top sticks are situated in the winding slots of the stator to interpose the conductive windings and the rotor. The elongate top sticks have a conductive portion insulated from the conductive windings to form an electrostatic shield arrangement. In exemplary embodiments, the top stick includes an insulative portion situated between the conductive portion thereof and the conductive winding of the respective slot. Preferably, the top stick's conductive portion is in electrical communication with the magnetically permeable core.

The top sticks may be constructed as a composite element having an insulative layer and a conductive layer. The conductive layer may be formed by a metallic paint, such as a copper paint. In addition, the elongate top sticks may be configured having a generally U-shaped configuration. In this case, the conductive layer may be in electrical communication with the magnetically permeable core by direct contact with inside walls of the winding slot.

Generally, the stator will further comprise first and second coilheads located at opposite axial ends of the magnetically permeable core. In such embodiments, first and second electrostatic coilhead shields are preferably situated adjacent respective inside surfaces of the coilheads. In exemplary embodiments, the electrostatic coilhead shields may comprise respective sheet assemblies, each having an insulative portion and a conductive portion. The insulative portion is situated between the conductive portion and the coilheads.

Other objects of the present invention are achieved by an electromechanical machine comprising a fixed stator having conductive windings located in a plurality of parallel, axially-extending winding slots defined about an inner surface of a magnetically permeable core. The stator further comprises first and second coilheads located at opposite axial ends of the magnetically permeable core. A movable rotor is located radially inward of the stator. First and second electrostatic coilhead shields are also provided, situated adjacent respective inside surfaces of the respective coilheads. It will often be desirable to further provide electrostatic slot shields located in each of the winding slots.

In exemplary embodiments, the electrostatic coilhead shields each comprise sheet assemblies having an insulative portion and a conductive portion. The insulative portion is situated between the conductive portion and the respective coilhead. Often, it will be desirable to form the conductive portion of each sheet assembly as a layer of metallic paint.

The sheet assemblies may each include at least one finger portion extending into a winding slot of the magnetically permeable core. In addition, each of the sheet assemblies may comprise a plurality of sheet members electrically connected together to form a continuously conductive annular coilhead shield. The conductive portion of each sheet assembly may be electrically connected to the magnetically permeable core via the finger portion thereof.

Still further objects of the present invention are achieved by an electromechanical machine comprising a movable rotor and a fixed stator. The fixed stator includes a magnetically permeable core defining a plurality of parallel, axially-extending winding slots defined about an inner surface thereof. Multiphase conductive windings are located in the winding slots. In addition, phase insulating and electrostatic shielding material is situated between respective phases of the multiphase conductive windings.

In exemplary embodiments, the phase insulating and electrostatic shielding material comprises a composite sheet material having an inner conductive layer and outer insulative layers. The inner conductive layer is preferably electrically connected to ground.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
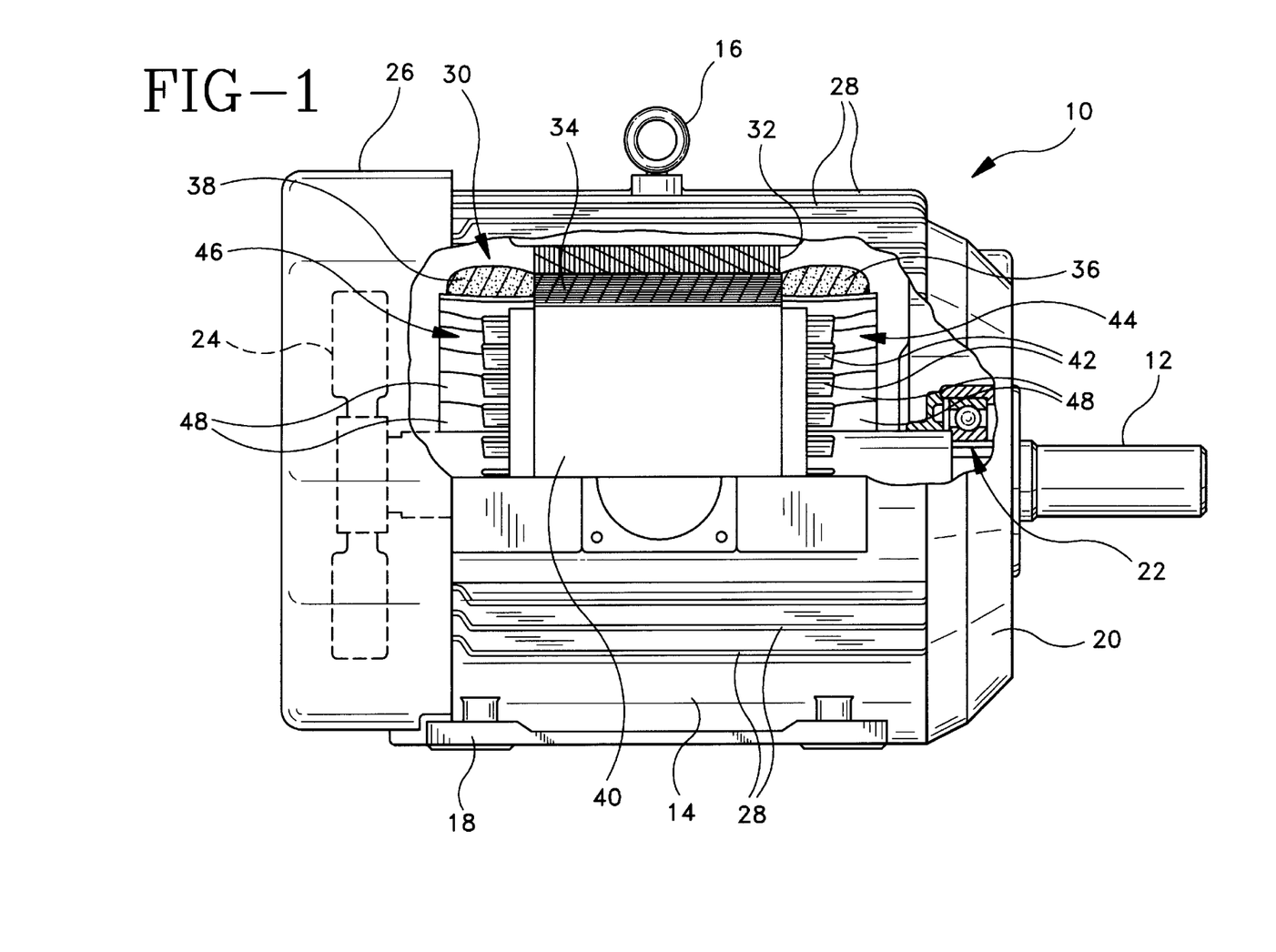
FIG. 1 is an elevational view of an electric motor showing the motor housing partially cut away to reveal various internal components therein.
Figure 2:
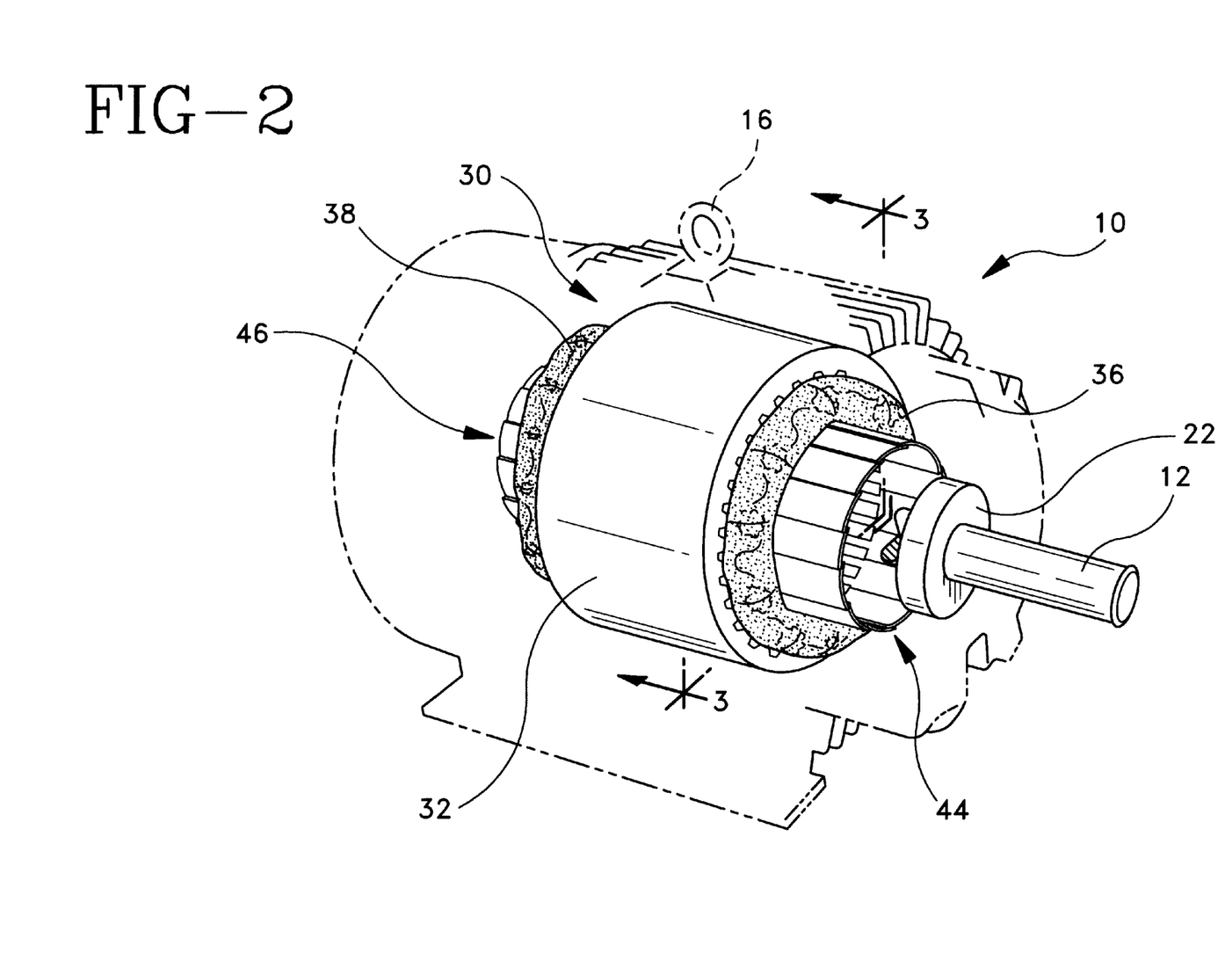
FIG. 2 is a perspective view of the stator and a portion of the motor shaft, with the motor housing being shown in phantom.

Referring now to FIGS. 1 and 2, an electric motor 10 constructed in accordance with the present invention has a rotatable shaft 12 extending along a central axis. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes end portions, such as end bell 20, located at respective axial sides of main housing portion 14. The end portions may be attached to main housing portion 14 by any appropriate means, such as by bolts. Typically, each end portion will maintain a respective bearing assembly, such as bearing assembly 22, to facilitate rotation of shaft 12.

Shaft 12 continues through bearing assembly 22 and beyond end bell 20 for connection to other equipment. The opposite end of shaft 12 carries a fan 24, located within shroud 26. Due to the configuration of shroud 26, rotation of fan 24 causes cooling air to circulate around various cooling fins 28 defined on the exterior of main housing portion 14.

Inside of its housing, motor 10 includes a stator 30 that remains fixed during operation. Stator 30 includes a magnetically permeable core 32 preferably comprising a plurality of relatively thin laminations arranged in a stack. As indicated at 34, longitudinal windings are located in parallel, axially-extending slots defined about the inside surface of core 32 to provide a flow path for flux-generating current. The windings turn at respective coilheads 36 and 38 to return along a parallel slot.

A rotor 40, secured to shaft 12, desirably rotates based on the electromagnetic interaction between it and stator 30. In the illustrated embodiment, motor 10 is an induction motor, wherein rotor 40 is constructed as a "squirrel cage" in a known manner. A plurality of radial vanes, such as vanes 42, may be provided at the periphery of the rotor ends to circulate cooling air inside the motor housing.

During operation, capacitive coupling between the stator and rotor of an electric motor may produce errant currents through the bearing assemblies utilized to support the rotatable shaft. As described above, arcing in the bearing assembly can pit the race on which the ball or roller bearings ride, leading to increased maintenance requirements. To reduce capacitive coupling, the present invention provides an electrostatic shield arrangement interposed between rotor 40 and the conductive windings of stator 30.

The electrostatic shield arrangement provides a conductive path to ground for charge that could otherwise collect on rotor 40. In addition, the electrostatic shield arrangement is constructed so that the conductive path will be well-insulated from the conductive windings of stator 30. This is particularly advantageous in inverter-driven motor applications due to the high switching voltages that can be developed.

In the illustrated embodiment, the electrostatic shield arrangement is configured to provide continuous shielding from coilhead 36 across the slot windings to coilhead 38. Toward this end, motor 10 includes a pair of annular coilhead shields 44 and 46 located adjacent the respective inner surfaces of coilheads 36 and 38. As will be explained in more detail below, coilhead shields 44 and 46 are each constructed as a sheet assembly providing a continuously conductive annulus insulated from the coilhead windings.

Figure 3:
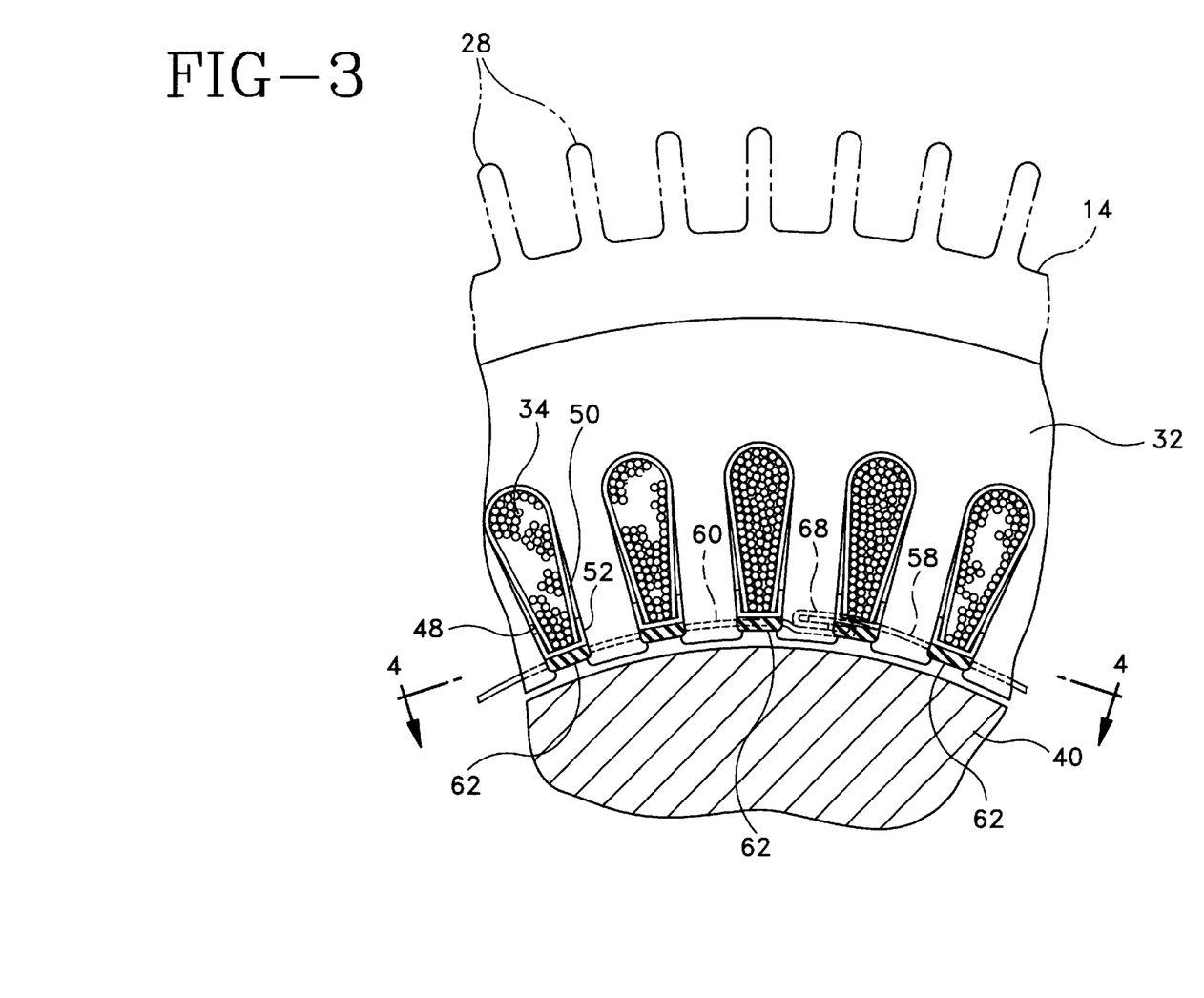
FIG. 3 is an enlarged, partial cross sectional view as taken along line 3—3 of FIG. 2.
Figure 4:
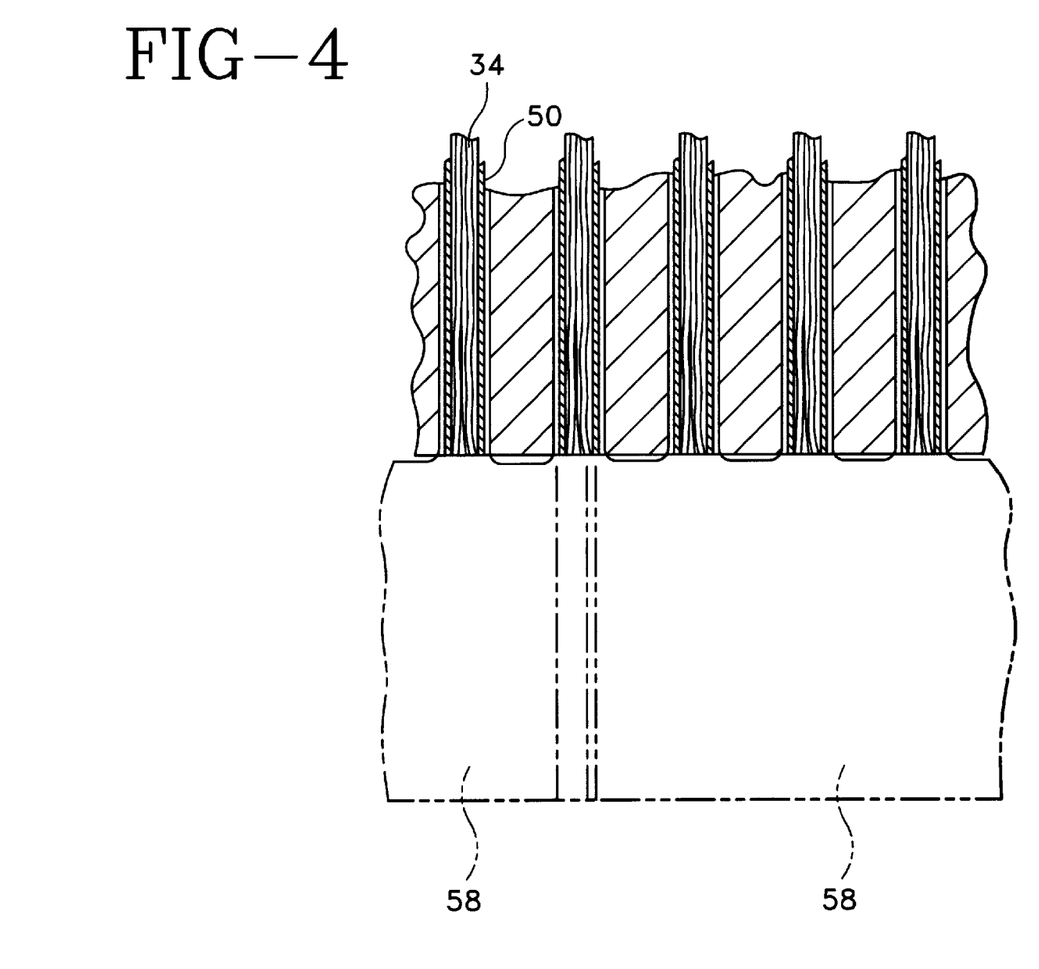
FIG. 4 is an enlarged, partial cross sectional view as taken along line 4—4 of FIG. 3.
Figure 5:
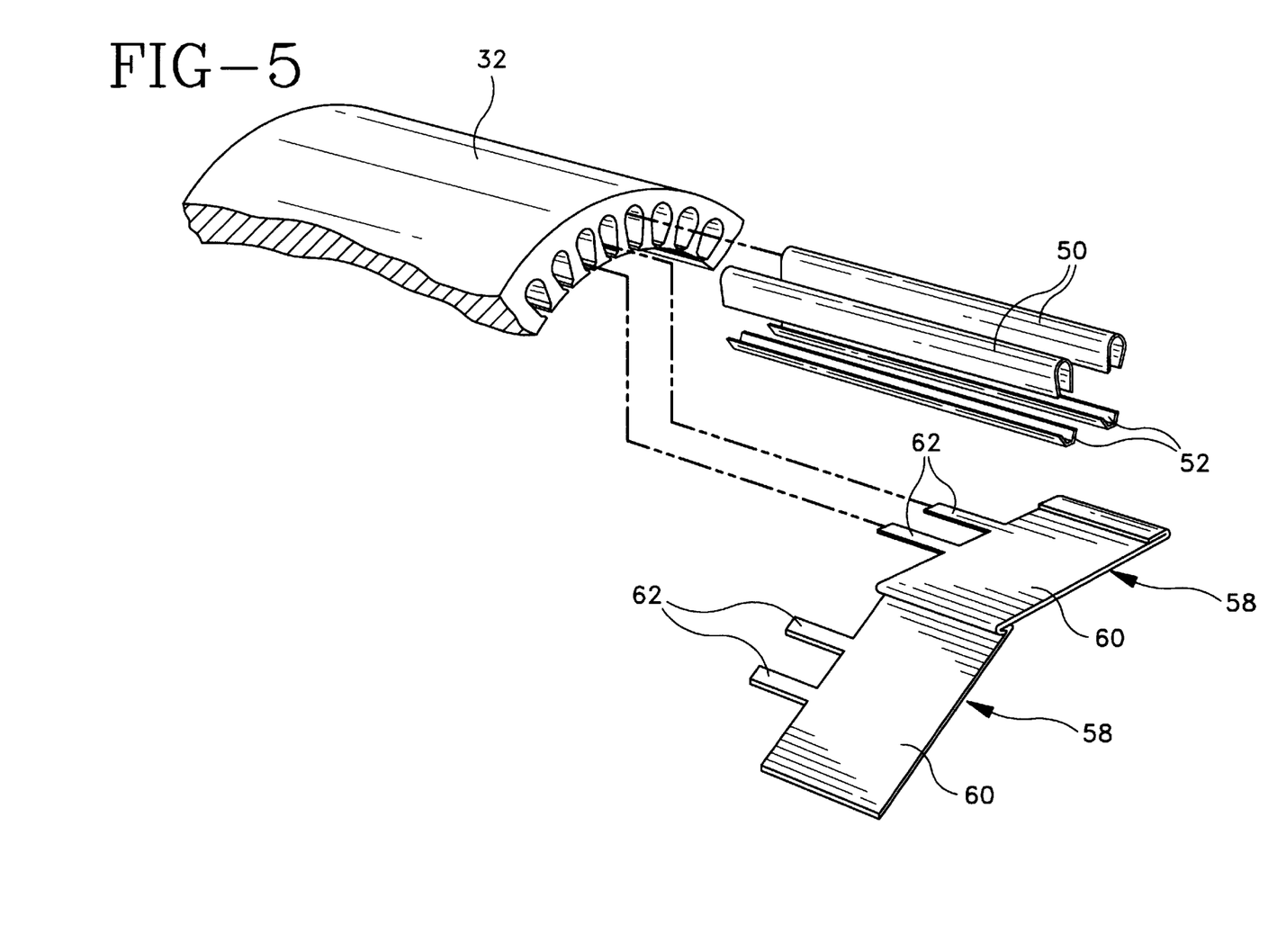
FIG. 5 is an assembly view showing the positioning of various elements with respect to the winding slots defined in the magnetically permeable core.

The construction of the shield arrangement in the area of stator 30 located axially between coilheads 36 and 38 is illustrated in FIGS. 3 through 5. As can be seen, conductive windings 34 each comprise a plurality of individual conductors situated in winding slots 48. Although the conductors are individually insulated, an insulative slot liner 50 is preferably located in each slot to further prevent the possibility of grounding to core 32. A top liner 52, known as a "top stick," is located at the "top" of each slot and extends substantially the entire axial length of core 32.

Figure 5A:
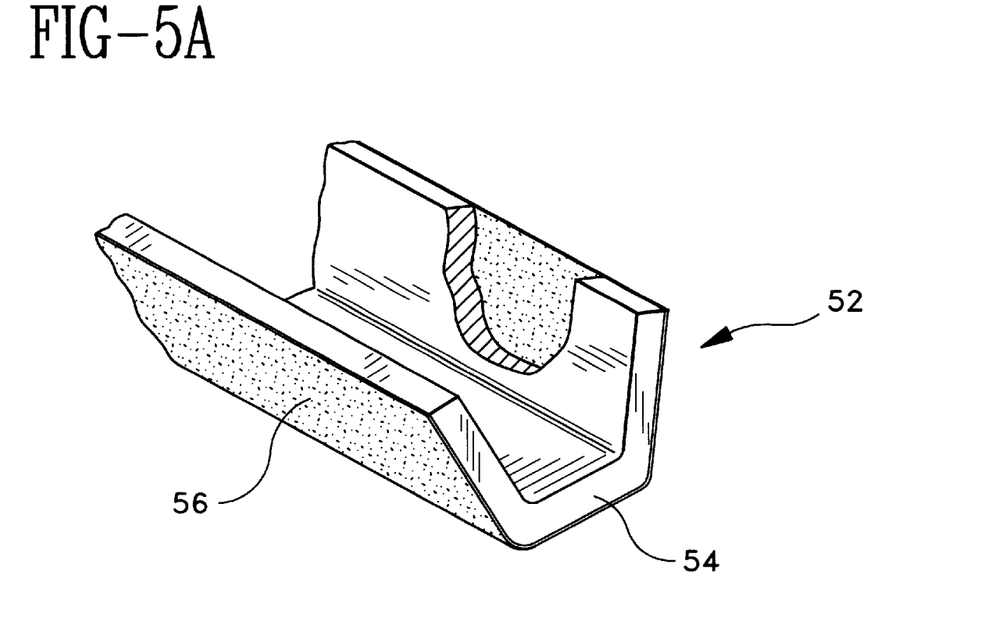
FIG. 5A is an enlarged view, partially cut away to show the construction of elongate top sticks used to form the illustrated electrostatic slot shield.

The construction of top stick 52 can be most easily explained with reference to FIG. 5A. As shown, top stick 52 has a generally U-shaped configuration comprising an insulative layer 54 of a suitable polymeric material. Prior art top sticks have often been made from Nomex or Mylar, which are also believed to be suitable materials for insulative layer 54. Unlike the prior art, however, top stick 52 further includes a conductive layer 56 on its outer surface.

It can be seen that insulative layer 54 thus separates conductive windings 34 from conductive layer 56. As shown in FIG. 3, the legs of top stick 52 are preferably located outside of slot liner 50 so that conductive layer 56 will contact the inside walls of slot 48. As a result, the electrostatic shield will be grounded to core 32. Because core 32 is already grounded, there is generally no need to provide a conductive layer on the inner surface of core 32 between adjacent winding slots.

Figure 6:
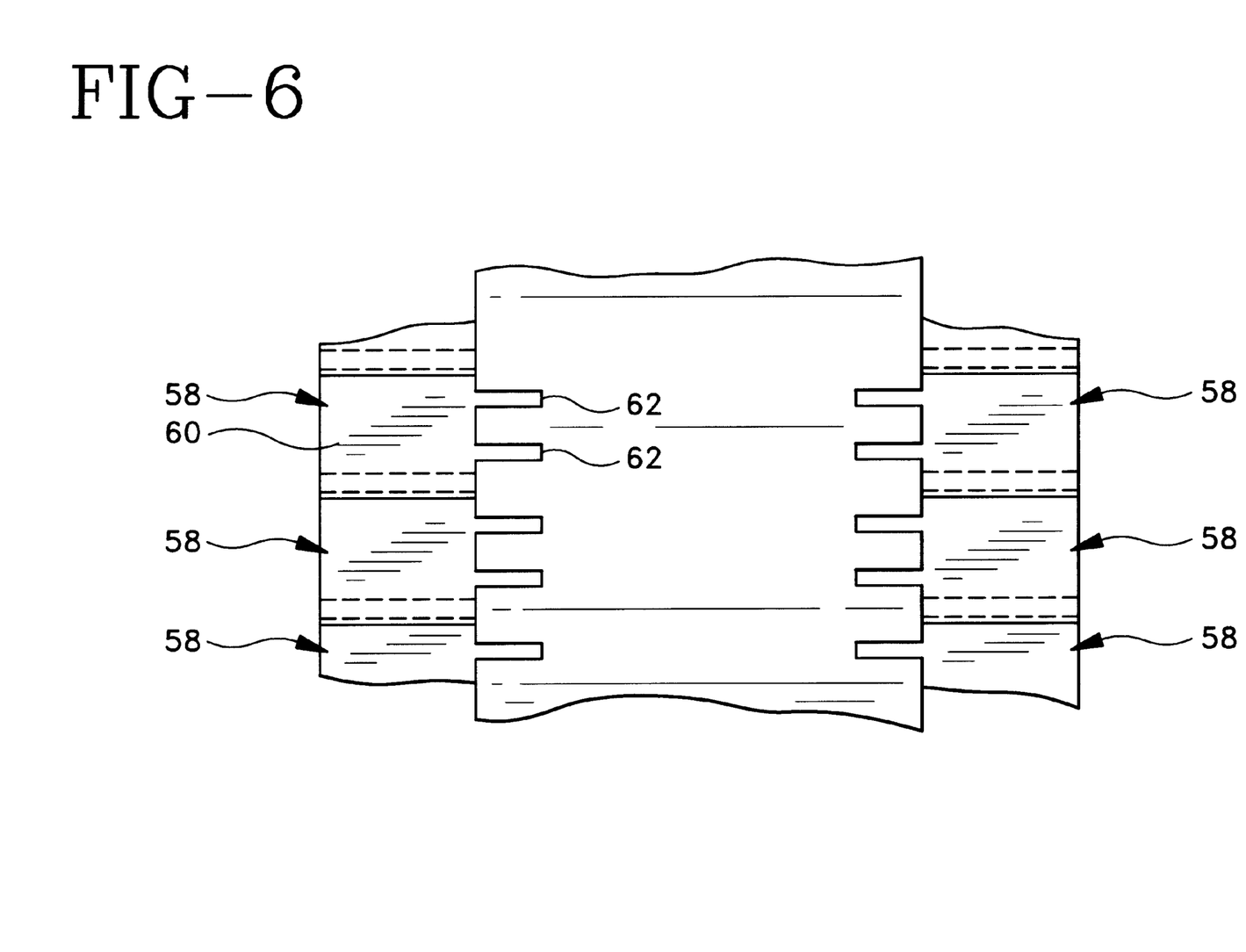
FIG. 6 is a plan view showing the relative position of coilhead shields at opposite axial ends of the magnetically permeable core.

The construction of electrostatic coilhead shields 44 and 46 can be most easily explained with reference to FIGS. 4 through 6. In the illustrated embodiment, each shield is constructed as a sheet assembly comprising a plurality of individual sheet members 58. Each sheet member 58 comprises a main shield portion 60 having one or more finger portions 62 extending therefrom. Finger portions 62 are adapted to extend into slots 48 above top sticks 52.

Figure 5B:
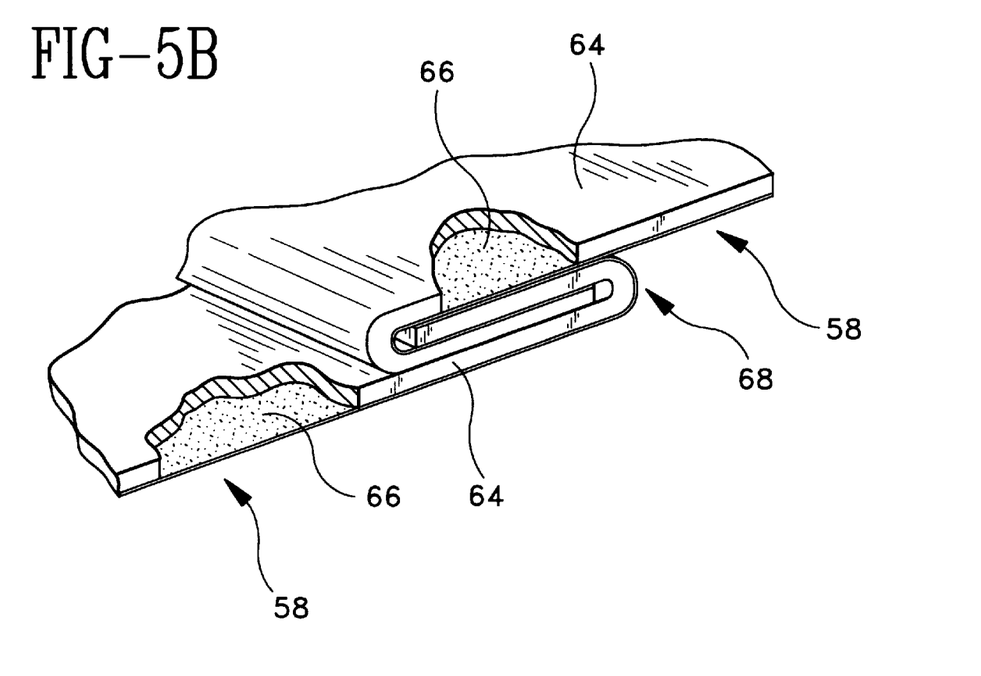
FIG. 5B is an enlarged view, partially cut away to show the construction of sheet members used in the illustrated coilhead shield.

Referring now particularly to FIG. 5B, it can be seen that sheet members 58 comprise an insulative layer 64 having a conductive layer 66 on one surface thereof. Each sheet member 58 is oriented such that conductive layer 66 will be radially inward (i.e., closer to shaft 12) with respect to insulative layer 64. Insulative layer 64 will thus serve to separate conductive layer 66 from the coilhead windings. The sheet members are grounded to core 32 by the direct contact of conductive layer 66, as disposed on finger portions 62, with the inside walls of slot 48.

Preferably, the respective conductive layers of each sheet member in one of the coilhead shields will be connected together to provide electrical continuity about the shield annulus. In the illustrated embodiment, adjacent ends of main portions 60 are turned back and interconnected, as indicated at 68. In this manner, the conductive layers 66 will be in direct contact with one another. This configuration also ensures that the conductive layer will always remain separated from coilhead windings by an insulative layer. In the illustrated embodiment, the folded portion is maintained in position against an overlying conductive layer by friction. The present invention contemplates, however, that it may be desirable to adhere the two conductive layers, such as by solder or a conductive adhesive.

Figure 7:
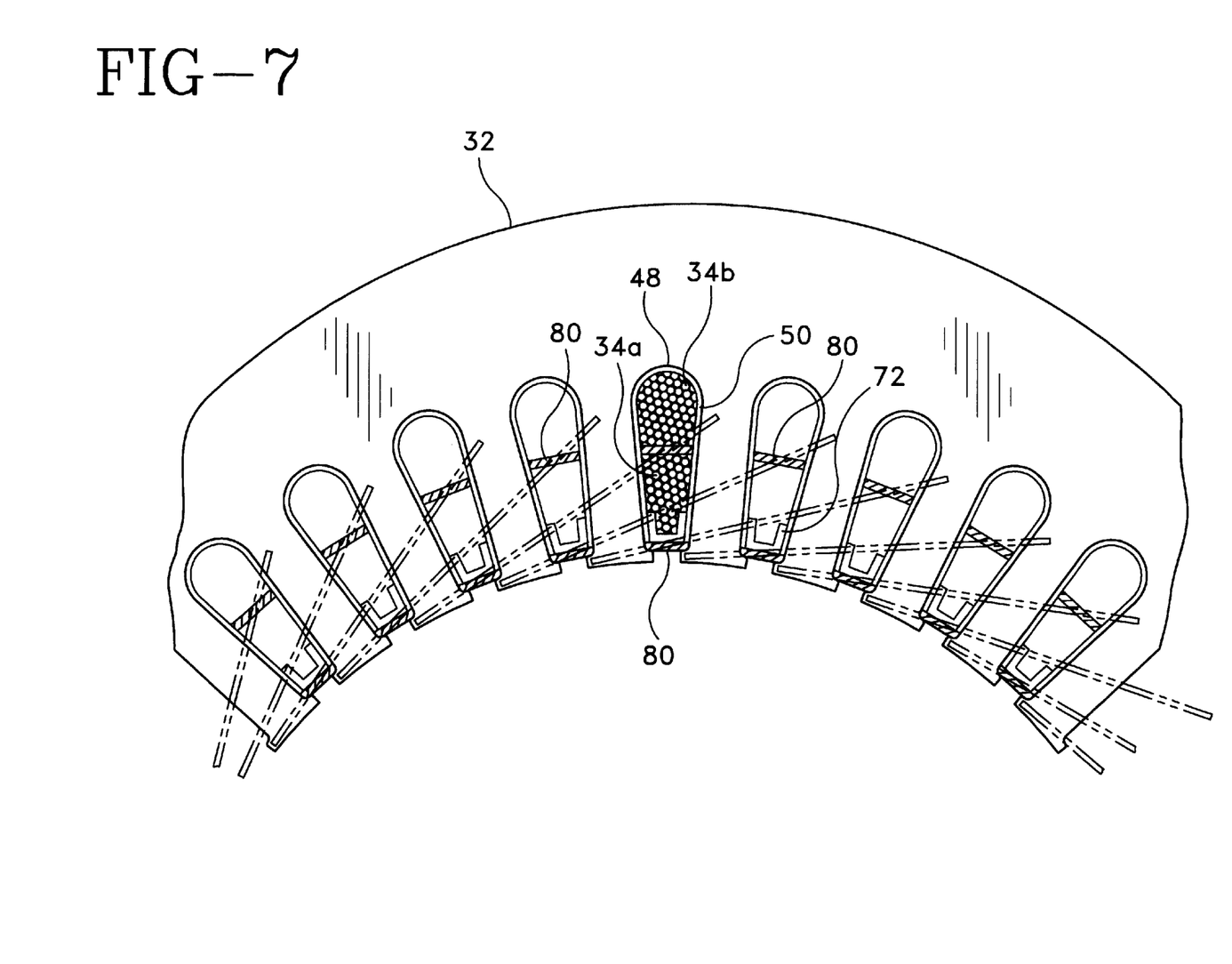
FIG. 7 is an enlarged partial cross sectional view taken at one end of the magnetically permeable core to illustrate the use of phase insulating and electrostatic shielding material according to the present invention.
Figure 8:
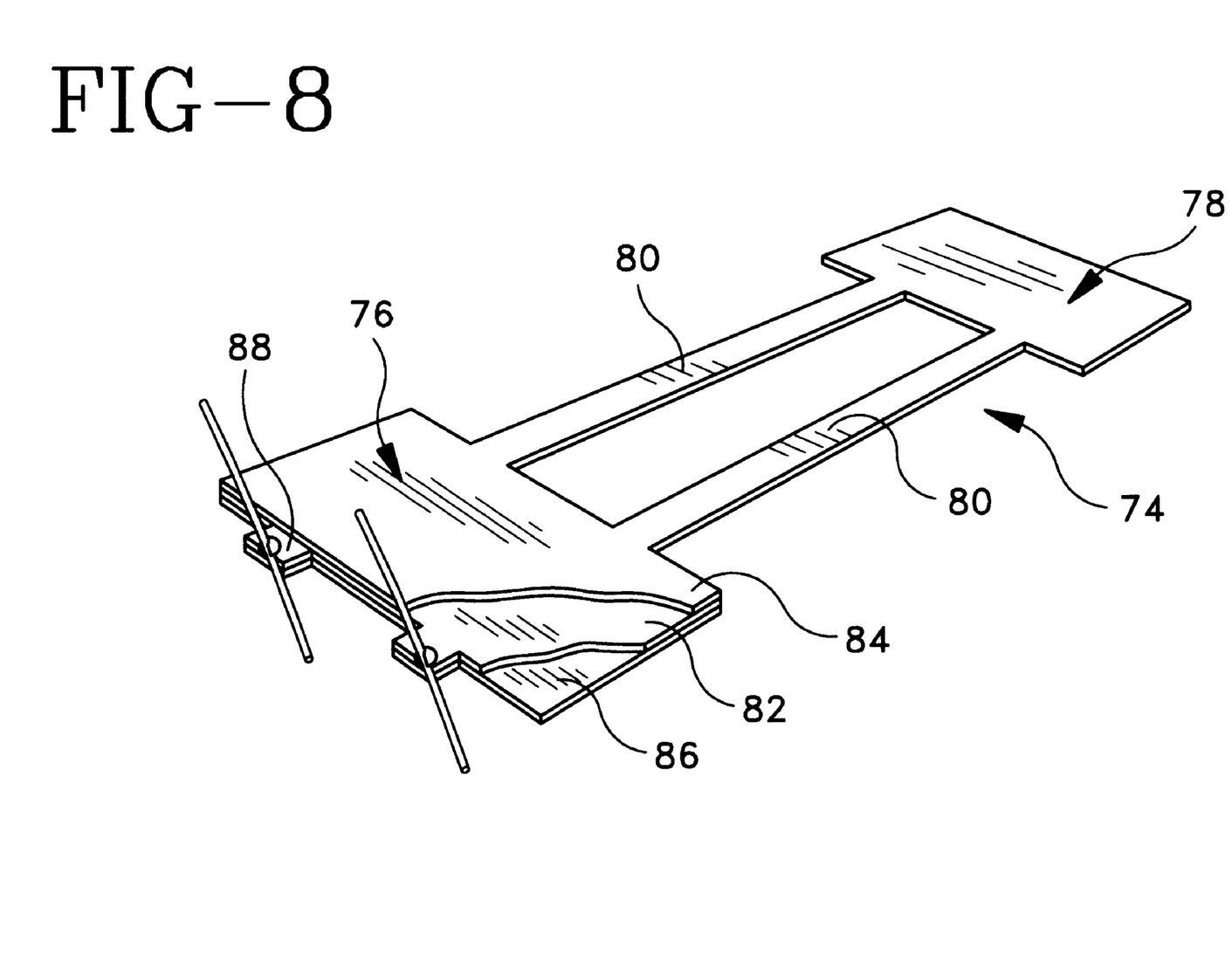
FIG. 8 is a perspective view of a preferred phase insulating and electrostatic shielding material according to the present invention, with layers cut away to show the construction thereof.
Figure 9:
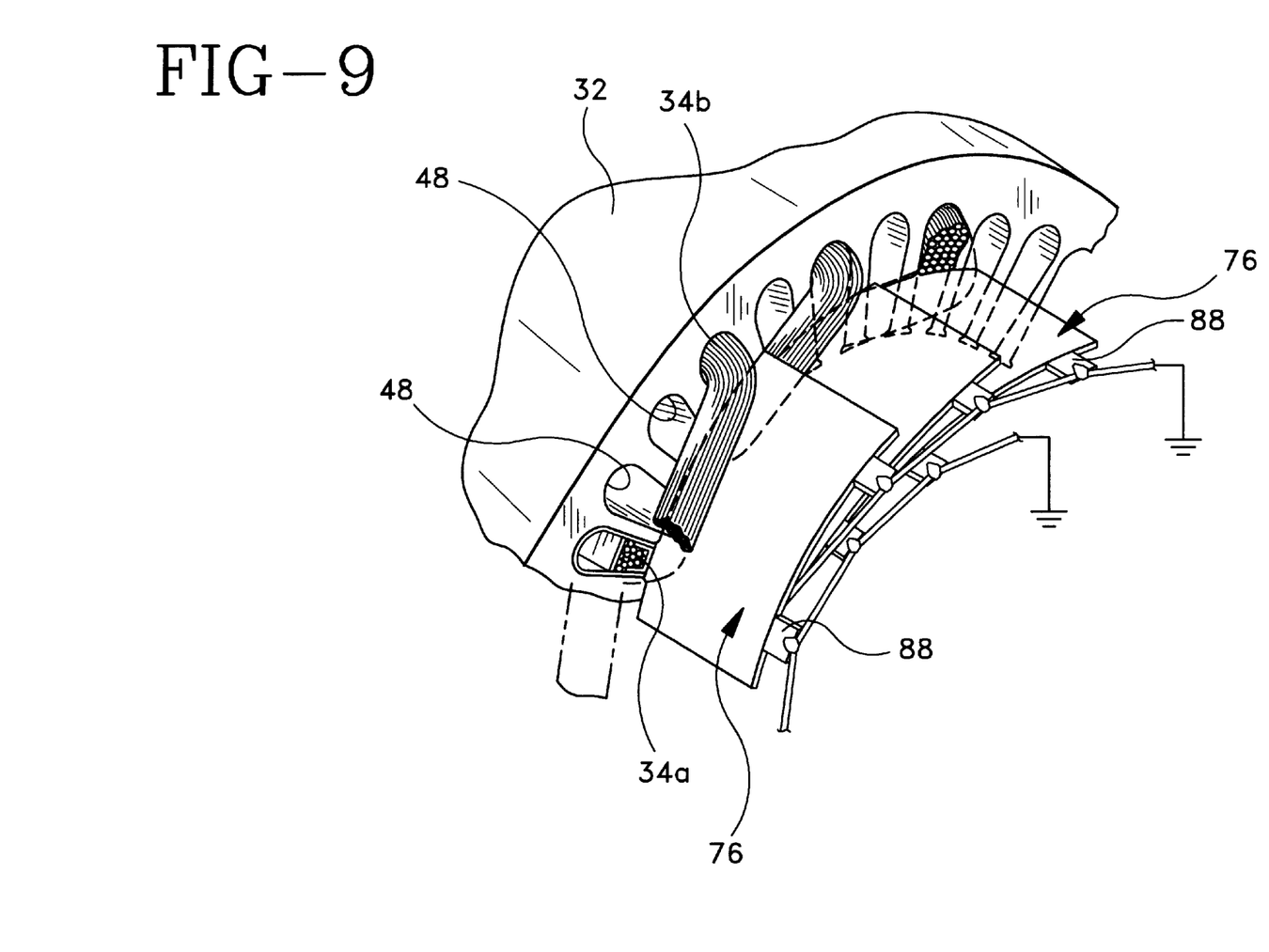
FIG. 9 is an enlarged perspective view showing further details of the arrangement of FIG. 7.

FIGS. 7 through 9 illustrate an alternative electrostatic shield arrangement constructed in accordance with the present invention. In multiphase motor applications, each slot 48 may carry windings for more than one phase. For example, FIGS. 7 and 9 show a multiphase motor configuration wherein each winding slot carries two distinct windings 34a and 34b, respectively located at the "top" and "bottom" of the slot. In typical fashion, each winding slot 48 has a slot liner 50 and a nonshielding top stick 72 of the prior art.

The phase windings in a multiphase motor have often been separated by insulating phase paper, such as "H-paper." In accordance with the present invention, an element 74 may be provided which serves the function of prior art phase paper while simultaneously providing an electrostatic shield. As can be clearly seen in FIG. 8, each element 74 has a shape like that of typical H-paper, including two end portions 76 and 78 interconnected by elongate finger portions 80. Elongate finger portions 80 extend axially within slots 48 to separate phase windings therein, while end portions 76 and 78 separate phase windings at the respective coilheads.

As can be seen in FIG. 8, element 74 is constructed as a three-layer composite. In particular, a conductive layer 82 of copper or other nonmagnetic material is sandwiched between two insulative layers 84 and 86. Conductive tabs may extend from end portion 76 as shown to permit grounding wires to be easily connected.

Insulative layers in the various embodiments discussed above may be formed of Nomex or other suitable insulative material. The conductive layers are preferably formed of a nonmagnetic material to prevent adverse effects on the magnetic properties of the machine. The conductive layers may be applied to their associated insulative layer by spraying or brushing, such as by application of a conductive paint. Paints suitable for this purpose which are copper filled and conductive when dried in a film are available from Spraylat Corporation of Chicago, Ill. In a known application, such paints have been used in the past to treat fan screens to reduce static buildup.

It can thus be seen that the present invention provides electromechanical machines having novel electrostatic shield arrangements. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An electromechanical machine comprising:
    a fixed stator having conductive windings located in a plurality of parallel, axially-extending winding slots defined about an inner surface of a magnetically permeable core, said stator further comprising first and second coilheads located at opposite axial ends of said magnetically permeable core;
    a rotatable rotor located radially inward of said stator; and
    first and second electrostatic coilhead shields situated adjacent respective inside surfaces of said first and second coilheads, wherein said electrostatic coilhead shields each include:
        i. sheet assemblies having an insulative layer and a conductive layer, said insulative layer being situated between said conductive layer and a respective of said coilheads; and
        ii. said sheet assemblies being configured to integrally define at least one finger portion extending into a respective one of said winding slots of said magnetically permeable core.

2. An electromechanical machine as set forth in claim 1, wherein said conductive layer of each said sheet assembly comprises a layer of metallic paint.

3. An electromechanical machine as set forth in claim 1, wherein each of said sheet assemblies comprises a plurality of sheet members electrically connected together to form a continuously conductive annular coilhead shield.

4. An electromechanical machine as set forth in claim 1, wherein said conductive layer of each said sheet assembly is electrically connected to said magnetically permeable core via said at least one finger portion thereof.

5. An electromechanical machine as set forth in claim 1, further comprising electrostatic slot shields located in each of said winding slots.

* * * * *